June 12, 1923.

F. M. BALDWIN

THREE-WAY SAFETY AUTO SIGNAL

Filed July 12, 1921

Inventor
Frederick M. Baldwin
by Graham + Harris
Attorneys

June 12, 1923.
F. M. BALDWIN
1,458,316
THREE-WAY SAFETY AUTO SIGNAL
Filed July 12, 1921  2 Sheets-Sheet 2
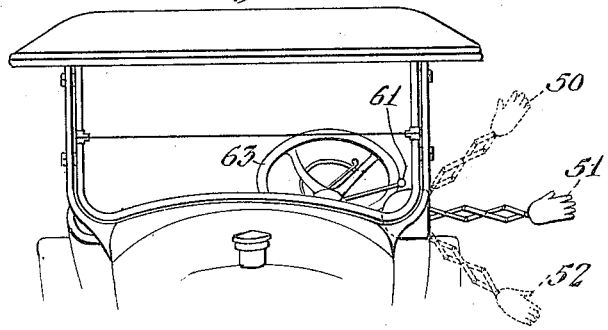
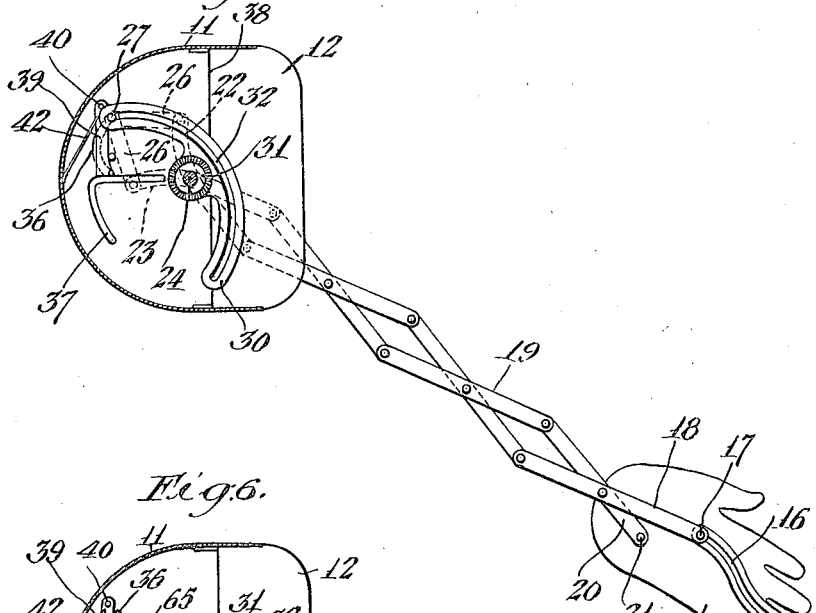
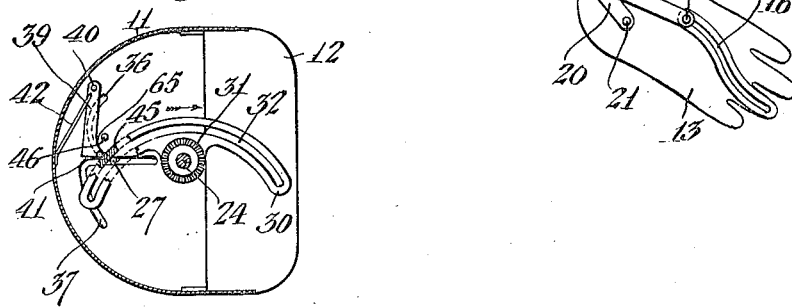
Inventor
Frederick M. Baldwin
by Graham + Harris
Attorneys Patented June 12, 1923.

1,458,316

UNITED STATES PATENT OFFICE.

FREDERICK M. BALDWIN, OF LOS ANGELES, CALIFORNIA.

THREE-WAY SAFETY AUTO SIGNAL.

Application filed July 12, 1921. Serial No. 484,052.

*To all whom it may concern:*

Be it known that I, FREDERICK M. BALDWIN, a citizen of the United States, residing at Los Angeles, in the county of Los Angeles and State of California, have invented a new and useful Three-Way Safety Auto Signal, of which the following is a specification.

My invention relates to direction signaling devices for use on automobiles and the like, by means of which the driver may indicate the direction about to be taken by the automobile.

It has been found desirable to indicate to other vehicles the direction that automobiles are about to take, it being particularly desirable that a following automobile should be able to know the direction to be taken by the preceding automobile, and the principal object of my invention is to provide a signaling device of the class described of simple form and construction by means of which it may be indicated whether the vehicle is about to turn to the right, or left, or stop.

Other objects and advantages will appear hereinafter from the following specification and drawings.

Referring to the drawings which are for illustrative purposes only,

Fig. 4 is a diagrammatic view of the front end of an automobile showing a device embodying my invention mounted thereon.

Fig. 5 is a view similar to Fig. 2 on a smaller scale, showing the hand in extended position.

Fig. 6 is a view similar to Fig. 5, showing the operating mechanism in a different position, the hand and connecting parts being omitted.

Figure 1:
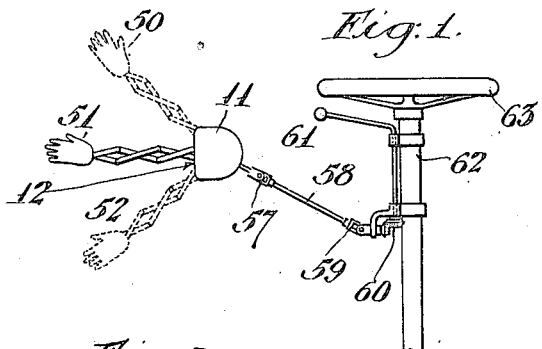
Fig. 1 is a diagrammatic view of a signaling device showing a convenient operating mechanism for such device.

The device consists of a casing or concealing means indicated at 11, which may be secured in any suitable manner to the dash or frame of an automobile in any convenient position, as shown in Fig. 4. This casing 11 is open on the outer side, as indicated at 12, for the purpose of permitting the signal member to freely work therethrough.

In the form shown, the signal member, indicated at 13, is made in the form of a hand, it being made of any suitable material and provided on one side with a slotted cam indicated at 16, such cam being arranged to receive a pin 17 on an outer arm 18 of a lazy tongs 19, the other outer arm 20 of such tongs being pivotally connected by means of a pin 21 to the hand 15. This manner of connecting the hand to the lazy tongs causes the hand to move from a vertical position to a horizontal position on extension of the lazy tongs. The inner arms 22 and 23 of the lazy tongs are pivotally mounted on a shaft 24 mounted in the casing 11, the ends of such arms being pivotally mounted or connected to links 25 and 26, the other end of such links being pivotally connected by means of a pin 27.

The pin 27 is operated through the medium of a cam 30 which is fixed to a beveled gear 31 on the shaft 24, such cam 30 being provided with a slot 32 which receives the pin and through the operation of the cam, transmits motion to the lazy tongs.

The pin 27 is directed in its movement by means of cam slots 35, 36 and 37 formed in a cam plate 38 mounted in the casing 11. The cam slots 36 and 37 may be deemed branch slots of the slot 35. The entrance of the pin 27 to the slot 36 is controlled by means of a gate 39 pivotally mounted by means of a pin 40 to the plate 38, such gate having a straight lower face 41 which forms part of the slot 35 when the gate is in closed position. The gate is elastically held in closed position by means of a gate spring 42 which presses the gate against a gate stop 43. The gate is arranged to be opened by means of the engagement of a gate cam or lug 45 on the cam 30 with a gate pin 46 on the gate as will be more fully hereinafter described.

In some localities, the person driving the vehicle is required to extend his arm from the side of the car and indicate the direction the machine is about to take by the position of such extended arm and hand. As indicated in Fig. 4, the upper dotted line position 50 may be used for indicating that the automobile is about to make a left hand turn.

The full line position, indicated at 51, may indicate that the automobile is about to turn to the right, and the dotted line position indicated at 52 may be used for indicating that the automobile is about to stop.

The device, above described, is so arranged as to permit the operator to have the hand 15 into any one of the three positions shown. This is done in the form shown by turning on the shaft 24, the cam 30 in either direction through the medium of a beveled gear 55 which meshes with the gear 31, the gear 55, being mounted on the shaft 56, which, through the medium of a universal joint 57, is connected to a shaft 58, a universal joint 59, beveled gears 60 with an operating lever 61 arranged preferably on the steering post 62 under the steering wheel 63.

By turning the cam in either direction, the first movement of the hand is in a straight direction outwardly from the casing due to the extension of the lazy tongs. This is due to the pin 27 being guided in the horizontal slot 35. If the automobile is making a left hand turn, this movement is all that is necessary to produce the proper signal. However, assuming that the cam is turning in the direction of the arrow indicated in Fig. 6, the gate cam or lug 45 on the cam 30 engages the gate pin 46 on the gate and a further movement of the cam 30 swings the gate aside to open the slot 36. The gate, being curved, as indicated at 65 and extending into the path of the slot 35, the pin 27 is directed into the slot 36, and, riding upwardly therein, guides the direction of extension of the lazy tongs bringing the hand into the position shown in Fig. 5.

It will be understood that a reverse turn of the operating lever will return the hand to its original position.

Figure 2:
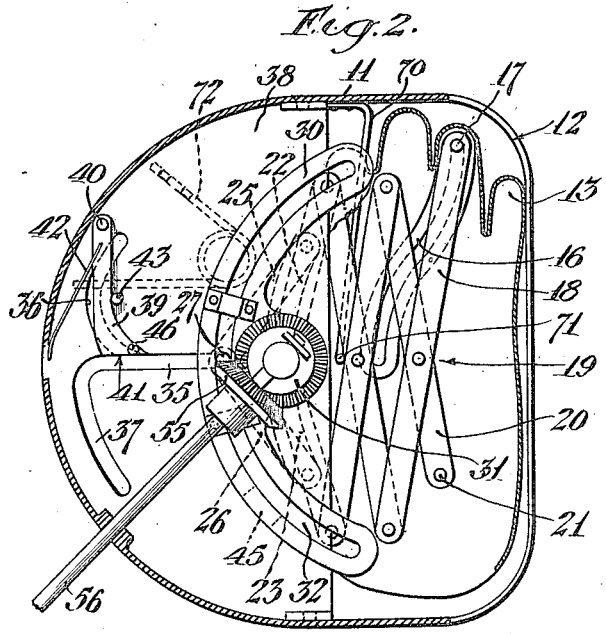
Fig. 2 is a vertical sectional view of the signaling device shown in Fig. 1 on a larger scale.

If it is desired to move the hand in the position indicated in dotted lines at 50 in Fig. 4, the cam 30 is moved in the direction of the arrows shown in Fig. 2, which causes the pin 27 to move outwardly in the slot 35 and down into the slot 37, such downward movement in the slot 37 causing the direction of the extension of the lazy tongs to be in the line indicated in dotted lines at 50 in Fig. 4.

Figure 7:
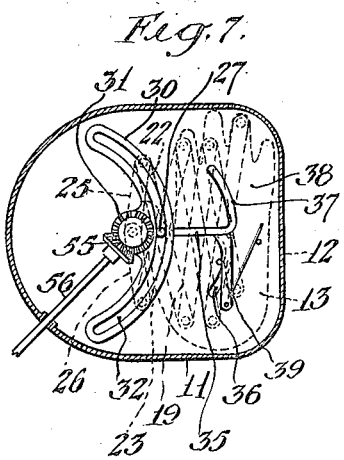
Fig. 7 is a view of a modified form of the operating mechanism.
Figure 3:
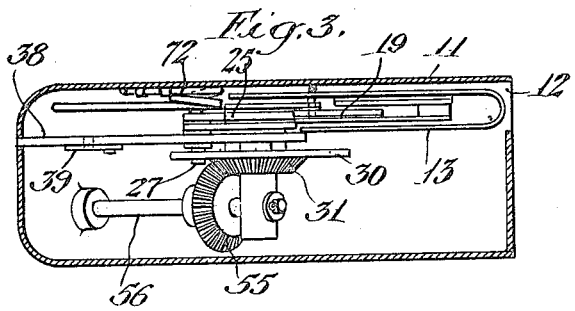
Fig. 3 is a sectional plan view of the device shown in Fig. 2.

In the form shown in Fig. 7, the inner ends of the links 25 and 26 are connected to the shaft 24 and the outer ends of such links connected to the inner ends of the lazy tongs. The inner arms 22 and 23 of the lazy tongs are pivotally connected by means of the pin 27 which engages in the slot 35 arranged in this form on the outer side of the shaft 24.

For the purpose of starting the lazy tongs in their outward movement I use a spring member 70 mounted on the casing having an end 71 engaging the lazy tongs.

For the purpose of assisting the return movement of the lazy tongs when the pin 27 is in the upper end of the slot 36 I mount a spring member 72 on the casing which is placed under tension by the pin 27 in its upward movement and which presses such pin downward on its return movement.

I claim as my invention:

1. In a direction signaling device for automobiles, a casing, a lazy tongs pivotally mounted in said casing, a display member on the outer end of said lazy tongs, a pair of links pivotally connected at one end to the inner end of said lazy tongs, a pin connecting the other end of said links and means engaging said pin arranged to operate said lazy tongs, and means for controlling the direction of movement of said pin whereby the angular position of the extended lazy tongs may be varied, said controlling means consisting of a cam plate having a cam slot therein to receive said pin, said slot having branch slots, and means controlling the entry of said pin to one of said branch slots.

2. In a direction signaling device for automobiles, a casing, a lazy tongs pivotally mounted in said casing, a display member of the outer end of said lazy tongs, a pair of links pivotally connected at one end to the inner end of said lazy tongs, a pin connecting the other end of said links and means engaging said pin arranged to operate said lazy tongs, and means for controlling the direction of movement of said pin whereby the angular position of the extended lazy tongs may be varied, said controlling means consisting of a cam plate having a cam slot therein to receive said pin, said slot having branch slots, and means controlling the entry of said pin to one of said branch slots, said last named means consisting of a pivoted gate, means for yieldingly holding said gate over the entrance to said controlled branch slot, and means for moving said gate clear of the opening of said branch slot.

3. In a direction signaling device for automobiles, a casing, a shaft, a lazy tongs pivotally mounted on said shaft, a display member on the outer end of said lazy tongs, a pair of links connected at one end to the inner end of said lazy tongs, a pin connecting the other ends of said links together, a cam member mounted on said shaft arranged to engage said pin, and means for controlling the direction of movement of said pin.

4. In combination, supporting-means containing three-way guiding-means, and a signaling-device mounted movably in said supporting-means and guiding-means for extension therefrom in either of three directions.

5. In combination, supporting means, having a trifid guideway a collapsible extensible signaling-device mounted thereon, and having a part slidable in said guideway for permitting of selectively extending said device at different angles to the supporting-means.

6. In combination, supporting-means, a collapsible extensible signaling-device mounted thereon, a three-way cam, said device having a part slidable along said cam for selectively extending said device at either of three angles to the supporting-means, and releasable securing means for holding said device when extended at any of said angles.

In testimony whereof, I have hereunto set my hand at Los Angeles, California, this 5th day of July, 1921.

FREDERICK M. BALDWIN.